Patented Sept. 18, 1951

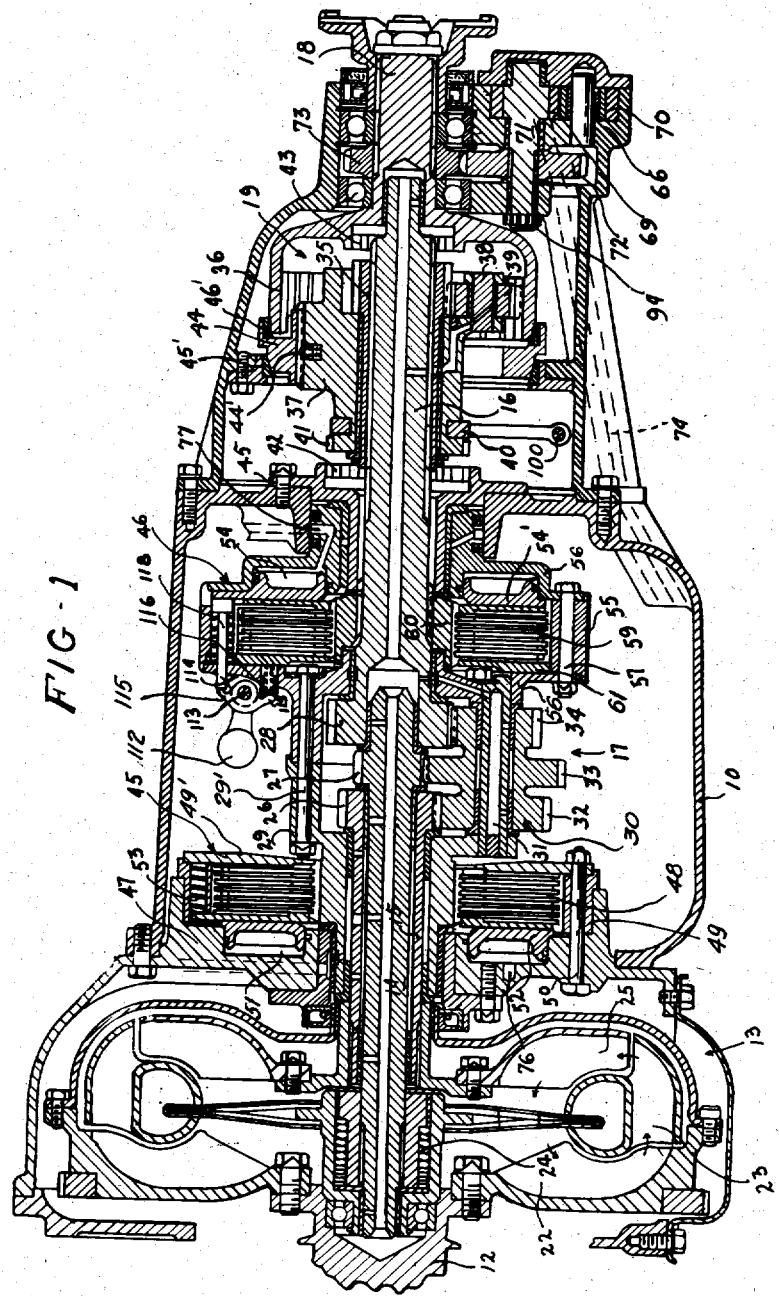

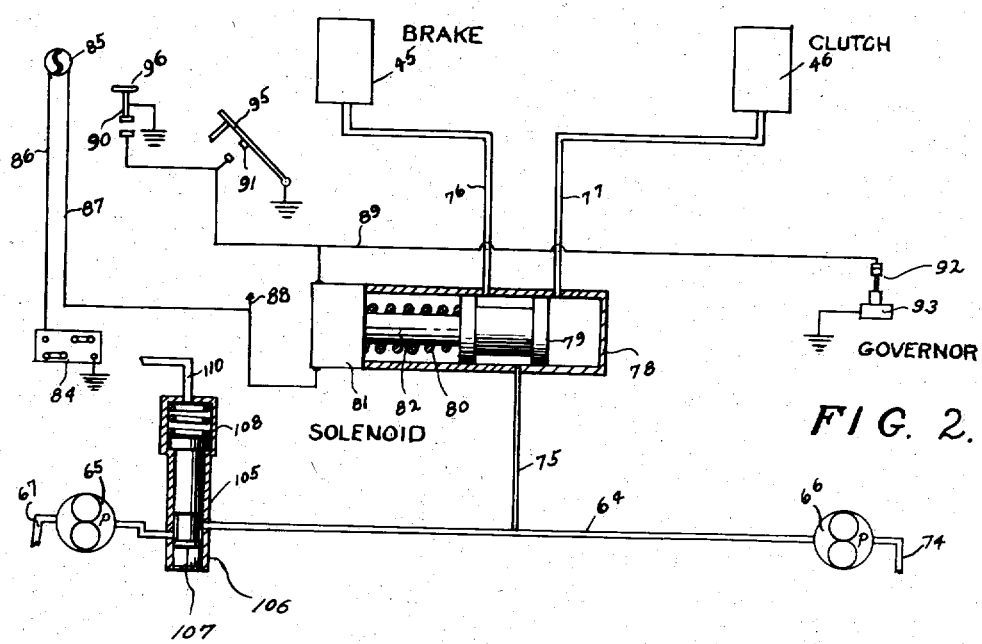
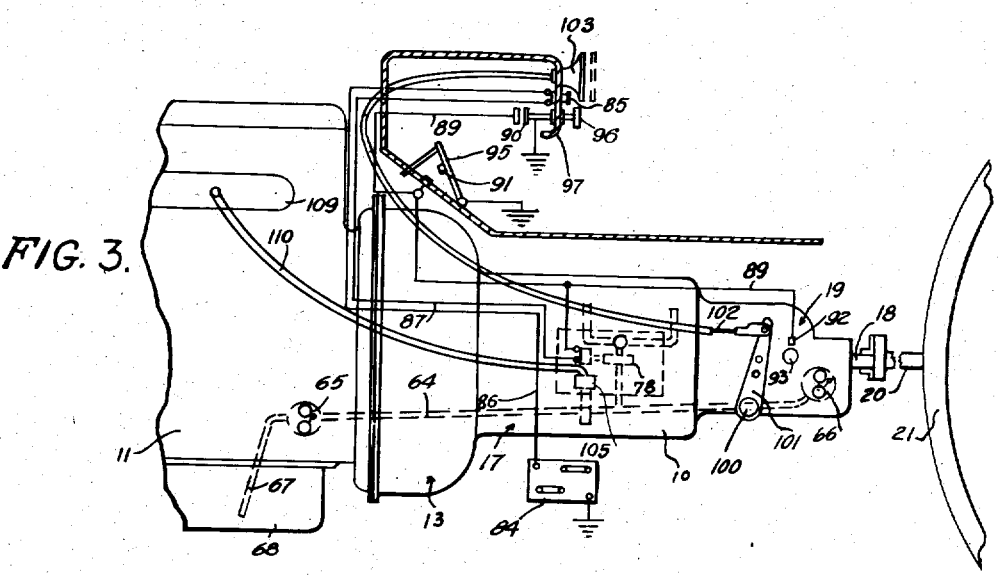

2,568,135

UNITED STATES PATENT OFFICE 2,568,135

TRANSMISSION MECHANISM

Jesse G. Vincent, Grosse Pointe Park, Mich., assignor to Packard Motor Car Company, Detroit, Mich., a corporation of Michigan Application March 15, 1945, Serial No. 582,933

8 Claims. (Cl. 74—472)

This invention relates to transmission mechanism and more particularly to control mechanism for planetary change speed gearing.

An object of the invention is to provide transmission mechanism for motor vehicles that will be quiet and smooth under all normal operating conditions.

Another object of the invention is to provide a fluid driven motor vehicle change speed transmission mechanism with control means whereby the mechanism will be ineffective to drive while the motor is idling and the vehicle is standing still although in geared relation for driving.

Another object of the invention is to provide a planetary change speed gearing, connected to an engine solely through a fluid coupling, with control means by which the following conditions may be had, to wit: several automatically selected forward speeds and one or more reverse speeds, positive driving coupling engageable or disengageable with a tail shaft, freedom from fluid coupling creep, step-down from high forward speed to a lower speed for rapid acceleration by overruling the automatic control, lower speed forward drive by overruling the automatic control independently of the throttle position, and cranking of a dead engine through the transmission by pushing the vehicle.

A further object of the invention is to provide a hydraulically actuated clutch in change speed gearing with means for neutralizing the effect of centrifugal force of the rotating fluid acting in clutch engaging direction.

Other objects of the invention will appear from the following description taken in connection with the drawings, which form a part of this specification, and in which:

Fig. 1 is a longitudinal sectional view of a transmission mechanism incorporating the invention;

Fig. 2 is a diagrammatic view of the control means for the transmission mechanism;

Fig. 3 is a fragmentary side elevational view of a motor vehicle showing the relation of the control means with the transmission mechanism.

Transmission mechanism is housed in casing 10 secured to one end of internal combustion engine 11. The engine crankshaft 12 is connected with a fluid coupling device 13 that transmits power from the engine to shafts 14 and 15. A driven shaft 16 aligns with the shafts 14 and 15 and epicyclic change speed gearing 17, of the planetary type, is connected to transmit drive from the clutch shafts to the driven shaft. Shaft 16 aligns with tail shaft 18 and forward and reverse selector mechanism 19 is arranged to couple or uncouple these shafts. The tail shaft is coupled to propeller shaft 20 suitably connected to drive wheels, one of which is indicated at 21, of a vehicle.

The fluid coupling device, the change speed gearing and the shafts referred to may be of the general type shown and described in patent application Serial No. 436,159, filed March 25, 1942, by William A. Duffield, now Patent 2,373,234. The coupling device comprises an impeller section 22 bolted to the crankshaft, a first runner 23 adapted to drivingly connect with shaft 14 through a spring type overrunning clutch 24, and a second runner 25 fixed to shaft 15. The runners are concentric with the impeller and are designed and arranged so that liquid will flow therethrough in series as indicated by arrows in Fig. 1.

The change speed gearing includes drive gear 27 formed or fixed on shaft 14, drive gear 26 formed or fixed on shaft 15, driven gear 28 formed or fixed on shaft 16, carrier 29 and multiple spool gears 30 rotatable on pins 31 fixed to the carrier. The spool gears each comprises gear 32 meshing with gear 26, gear 33 meshing with gear 27 and gear 34 meshing with gear 28.

The forward and reverse selector mechanism 19 includes a sun gear 35 slidably splined to shaft 16, ring gear 36 fixed to tail shaft 18, carrier 37, pins 38 fixed on the carrier and planet gears 39 rotatable on the pins and meshing with gears 35 and 36. The carrier is fixed in an axial direction with sun gear 35 and is axially shiftable by fork 40 to engage teeth 41 on the forward end of the carrier with teeth 42 formed on member 45" attached to the casing when moved forwardly and to engage the sun gear teeth with teeth 43 on the ring gear when moved rearwardly. A synchronizer ring 44 is slidably splined to the carrier and is restrained by spring pressed balls 44' to shift with the carrier until a conical end engages brake cone 45' fixed to the casing or brake cone 46' fixed thereon engages a conical end of ring gear 36. Thus the carrier will be stopped in its rotation before teeth 41 engage teeth 42 or the ring gear 36 will be held stationary with the carrier before it is engaged with teeth 43.

Shaft 16 will drive shaft 18 forwardly therewith when sun gear 35 is shifted to engage teeth 43 as such shafts will then be locked together. When the carrier is locked to the casing by engagement of teeth 41 and 42, the sun gear 35 is free from the tail shaft and the planet gears will be rotated to rotate ring gear 36 reversely to the direction of the sun gear rotation. When the carrier is midway between forward and reverse drive, there will be no coupling between shafts 16 and 18 so the device is in neutral position even though the change speed gearing is conditioned to drive shaft 16.

Circulation of fluid in the coupling 13 will be caused by rotation of impeller 22 moving fluid first through runner 23 and then through runner 25. Runner 23 will first become effective to drive the change speed gearing through overrunning clutch 24, shaft 14, and gears 27, 33, 34 and 28. As the fluid coupling speed increases runner 25 will take over the drive to shaft 16 through shaft 15, and gears 26, 32, 34 and 28, and under such driving condition shaft 14 may overrun runner 23. Gears 27 and 33 have a ratio to provide the low speed drive and gears 26 and 32 have a ratio to provide a higher speed drive. When either pair of meshing gears is made effective to drive, carrier 29 must be braked. High speed or direct drive may be obtained by locking tde carrier 29 to shaft 16 and at such time braking of the carrier must be discontinued.

The carrier may be braked or locked by control means, in the form of hydraulically operated devices 45 and 46, operative automatically to provide three driving speeds. Device 45 is a brake for holding carrier 29 stationary with casing wall 47 in which is provided a chamber 51. Brake plates 48 are alternately splined on the carrier 29 and sleeve 49 projecting into the recess, such sleeve and a backing member 49' being secured to wall 47 by bolts 50. Piston 52 in chamber 51 is operated to engage the brake plates while springs 53 normally disengage such plates.

Device 46 is a friction clutch housed in chamber 54 formed by casing members 55 and 56 secured by bolts 57 to the carrier end flange 58. This chamber contains clutch plates 59 alternately splined to sleeve 60 that is splined on shaft 16 and to casing member 55. Backing plate 61 is arranged in the front end of the clutch chamber to engage the clutch plates for locking shaft 16 to carrier 29. Oil pressure against piston 54' in chamber 54 will engage the clutch.

The brake and the clutch pistons are moved to engage the adjacent plates by a fluid system having a conduit 64 connected at its ends with pumps 65 and 66, pump 65 being driven by the engine and having an inlet conduit 67 open to the oil in the bottom of engine pan 68. Pump 66 comprises gears 69 and 70, gear 69 being fixed on shaft 71 having gear 72 splined thereon and meshing with gear 73 splined on the tail shaft 18. Oil is drawn through passage 74 in the casing 10 from the sump below the change speed gearing. Conduit 75 connects conduit 64 with a valve device housing 78 and conduits 76 and 77 lead from the housing. Conduit 76 may be any suitable drilled passage or tube leading to brake chamber 51, and conduit 77 may be a suitable passage in casing 10 leading to the clutch chamber 54.

Housing 78 contains a shiftable valve 79 having a middle reduced diameter portion providing a space through which oil can flow from conduit 75 to conduit 76 or to conduit 77 depending upon the valve position. Spring 80 normally will move the valve to connect the fluid system with the clutch chamber and shutting off the system to the brake chamber.

The valve device is under the control of an electric system having a solenoid 81 acting upon stem 82 of valve 79, when energized, to pull it to the left position, as shown in Fig. 2, opening the hydraulic system to the brake chamber and shutting off the system to the clutch chamber. The electric system comprises circuit means in which a plurality of devices or instrumentalities are provided for controlling the current to the solenoid as required for various driving operations.

The circuit means is arranged to utilize a portion of the engine ignition system. The source of electricity may be battery 84 connected with an ignition switch 85 by conductor 86. Conductor 87 leads from the ignition switch to the solenoid and has a conductor 88 leading therefrom to the engine ignition system. Conductor 89 leads from the solenoid and may be grounded to complete the solenoid circuit by switch devices 90, 91 and 92 arranged in parallel. Switch 92 is operated by a governor device 93 driven by gear 94 fixed on pump shaft 71. As the pump shaft is driven from the tail shaft 18 the governor will operate in accordance with vehicle speed. The arrangement is such that switch 92 will be closed by the governor below a predetermined vehicle speed and thus the solenoid circuit will be broken during the major portion of the vehicle operation. Switch 91 is controlled by the accelerator pedal 95 and is arranged to be closed while the pedal is depressed beyond wide open throttle position. Switch 90 is operated manually by a knob 96 at the vehicle dash 97. When any one of the switches 90, 91, 92 is closed the solenoid circuit will be closed and the solenoid will move the valve 79 against the pressure of spring 80 to open the hydraulic system to brake device 45 thereby holding carrier 29 stationary whereby power will flow through shafts 14 and 15 as dictated by the fluid coupling runners and the load. When the switches are all open the solenoid circuit is broken and spring 80 will move valve 79 to shut off the hydraulic system to brake device 45, so that the carrier 29 is released, and opening the hydraulic system to the clutch to engage the same thereby locking shaft 16 directly to carrier 29 for direct drive through the change speed gearing.

Shifter fork 40 is fixed to shaft 100 and such shaft is rotatably actuated by lever 101 to which Bowden wire 102 is attached. This control wire extends to the vehicle dash and has a knob 103 fixed to its end that is actuated by the driver to establish forward drive, reverse drive, or neutral.

Pump 66 does not operate when the vehicle is standing still because its drive shaft is not rotating and under this condition, engine driven pump 65 supplies the fluid to the hydraulic system when the engine is running. Flow control means 105 is provided in conduit 64 to shut off flow from pump 65 while the engine is idling so that when the vehicle is standing still there will be no fluid pressure to engage either brake 45 or coupling 46 and consequently, the fluid clutch driven change speed gearing will idle and will not drive. This arrangement prevents the vehicle from creeping while waiting at a traffic signal with the transmission mechanism coupled to the tail shaft. While standing still with the engine idling, depression of the accelerator pedal will open the valve means 105 so that pressure will immediately engage brake 45 to reestablish the drive for starting the vehicle. Valve housing 106 is disposed in conduit 64 between pump 65 and conduit 75 and carries therein a valve 107 normally moved to open position by spring 108. The housing is connected with the engine intake manifold 109 by conduit 110 so that one end of the valve is exposed to fuel intake pressure. When vacuum is high, as it is while the engine is idling and the vehicle standing still, valve 107 will be drawn upwardly to shut off flow through conduit 64. Below a predetermined suction pressure in the manifold spring 108 will hold the valve in open position.

Rotation of the housing of clutch 46 will throw oil therein outwardly thereby creating a force varying as the square of the rotational speed and such force added to the normal pressure of the fluid, as developed by the pumps, acts to move piston 54' in clutch engaging direction. This added centrifugal force is undesirable as it delays release of the clutch when dictated by the control means, so means for neutralizing the clutch engaging effect of this centrifugal force is provided. Weights, as indicated by numeral 112 are pivoted on pins 113 extending through parallel ears 114 on the carrier end flange member 58 forming a section of the carrier 29, such sections being secured together by bolts 29'. Each weight has oppositely disposed fingers 115, one of which is engaged by spring pressure member 116 and the other of which engages one end of an actuator rod 118 extending into the clutch housing and engaging the piston 54'. These weights move in or out in accordance with centrifugal force and as the rotational speed increases they move actuator rods 118 to create a force equal to and opposing that developed by centrifugal force of the fluid in the housing acting to engage the clutch. Thus the piston for engaging the cutch will be responsive only to the liquid force developed by the pumps as the fluid centrifugal force is neutralized.

Forward drive is obtained when sun gear 35 is engaged with ring gear teeth 43. Three forward speeds are obtained automatically. Below a predetermined vehicle speed, governor switch 92 is closed energizing solenoid 81 so that the valve 79 opens the system to engage brake 45 holding carrier 29 stationary. Under this condition either coupling runner 23 or 25 may be effective, so that the planetary gearing 17 will be conditioned to drive through the low or high ratio sets of gears. When the vehicle reaches some predetermined speed, such as 20 miles per hour, the governor 93 opens switch device 92 thereby breaking the circuit to the solenoid so that spring 80 moves valve 79 to its other position opening the hydraulic system to engage clutch 46. This clutch engagement will lock the carrier 29 and sun gear 28 together so that the gearing 17 rotates as a unit with shaft 15 to drive the tail shaft 18 at crankshaft speed except for the slip in fluid coupling 13.

In normal vehicle operation the governor dictates either high speed drive when switch device 92 is open or the lower speed drives when the switch device 92 is closed. There are operating conditions, such as passing another vehicle, where the driver may wish to overrule the governor to temporarily shift from high speed drive to second speed drive. Switch device 92 will be open deenergizing the solenoid to engage the clutch 46, so the accelerator pedal 95 is depressed beyond wide open throttle position to close switch device 91 and thereby complete the solenoid circuit and thereby shift valve 79 to close the hydraulic system to the clutch device and open it to the brake device. As long as switch device 91 is held closed the gearing will be conditioned for first or second speed drive, but when opened the control means will shift back to high speed drive provided the vehicle is still moving above the speed at which the governor will hold switch 92 open.

There are conditions, such as traveling downhill, where the driver wishes to overrule the governor without the accelerator pedal being held in wide open throttle position. By closing manually operable switch device 96, the solenoid will remain energized to establish lower speed drive even though the governor may dictate high speed drive.

Reverse drive takes place when carrier teeth 41 are engaged with teeth 42. It is possible for the control means to be effective the same as when in forward drive, but usually the governor switch will be closed so that the brake 45 will be engaged to establish first or second speed drive through the gearing 17. The anti-creep control means 105, effective when the vehicle is standing still with the engine idling, will function the same when the gearing is conditioned for either forward or reverse drives.

When the engine is stalled, it may be cranked by engaging selector mechanism 19 and pushing the vehicle. Shaft 18 will be rotated by the vehicle driving wheels 21 and pump 66 will be driven to charge the hydraulic system so that brake device 45 will be engaged, and the fluid coupling will be rotated through change speed gearing 17 to turn the crankshaft until the engine starts under its own power.

It will be understood that various forms of the invention other than that described above may be used without departing from the spirit or scope of the invention.

What is claimed is:

1. In a motor vehicle, the combination with an engine, driving wheels, and transmission means connecting the engine and the driving wheels and including a hydraulically operated device, of operating and control means for said device comprising a pump driven from the engine, a second pump driven from the driving wheels, a conduit leading to the device, connections from said pumps to said conduit, a valve in one of said connections, and means actuated by engine intake pressure for controlling the position of said valve.

2. In a motor vehicle, the combination with an engine, driving wheels, and transmission means connecting the engine and the driving wheels and including a hydraulically operated device, of operating and control means for said device comprising a conduit leading to the device, a pump having a normally open valved connection to said conduit and driven from the engine, a second pump having a connection to said device and driven from the driving wheels, and means operated by high intake vacuum of the engine to close said valved connection.

3. In a motor vehicle, the combination with an engine accelerator pedal, change speed gearing and a brake engageable to establish one speed relation of the gearing, of control means for the brake comprising a fluid system operable to control the brake, a shiftable flow control valve in the system, a solenoid normally energized to shift the valve to open the fluid system to apply the brake, a spring for shifting the valve to shut off fluid flow to the brake when the solenoid is deenergized, an electric circuit means, a speed controlled switch in the circuit for causing energization of the solenoid only below a predetermined vehicle speed, switch means in the circuit controlled by the accelerator pedal when beyond wide open throttle position for establishing the circuit means above the predetermined vehicle speed, and a manually controlled switch means in the circuit for establishing the circuit means above the predetermined vehicle speed.

4. In a motor vehicle, the combination with change speed gearing, a brake engageable with a portion of the gearing to establish one of the driving speeds and a clutch for establishing another driving speed through the gearing, of control means for the brake and the clutch comprising a fluid system operable to engage the brake or the clutch, a control valve in the system normally shutting off flow to the brake and establishing flow to the clutch, a solenoid operable when energized for shifting the valve to open the system to the brake, and electric circuit means connected with the solenoid, said circuit means including three switches in parallel, one of said switches being automatically closed below a predetermined engine speed and opened above such speed, the other two switches being operable at will by the vehicle driver.

5. In a motor vehicle, the combination with an engine accelerator pedal, planetary change speed gearing, and a governor responsive to vehicle speed, of control means for the gearing comprising a brake engageable to hold one element of the gearing stationary to establish low drive, a clutch engageable to lock two elements of the gearing together to establish high speed drive, a fluid system leading to said brake and said clutch, a valve in the system shiftable into two positions to selectively control fluid flow to said brake and said clutch, a spring acting to move the valve into position opening the system to the clutch, a solenoid acting when energized to move the valve into position opening the system to the brake, electric circuit means connected with the solenoid having three switches in parallel, one of said switches being operated by the governor to close the same below a predetermined vehicle speed, another of said switches being closed by the accelerator pedal when pressed beyond wide open throttle position, and the third switch being operable at will by the vehicle driver.

6. In a motor vehicle, the combination with an accelerator pedal, engine driven planetary gearing having a sun gear and a planet carrier, and a governor driven at vehicle speed, of control means for the gearing comprising means for braking the carrier, clutch means engageable to lock the carrier and the sun gear together, a fluid system for engaging the brake or the clutch, a shiftable valve in the system for selecting the fluid flow to the brake or the clutch, a spring for normally shifting the valve to open the system to the clutch, a solenoid for shifting the valve to open the system to the brake when energized, electric circuit means for energizing the solenoid, governor responsive control means for establishing the circuit below a predetermined engine speed, means operated by the accelerator pedal to close the circuit means when the pedal is moved beyond wide open throttle position, and means operative at will by the vehicle driver for closing the circuit means.

7. In a motor vehicle, an engine having an intake manifold, fluid coupling means driven by the engine, change speed gearing driven by the fluid coupling means, a brake operable to establish one driving speed through the gearing when engaged, power means operable to engage the brake, and control means for the power means comprising a pump driven from the engine, a second pump driven from the driving wheels, a conduit leading to the power means, connections from the pumps to the power means, a valve in one of the connections, and means actuated by engine intake pressure for controlling the position of said valve.

8. In a motor vehicle having driving wheels, change speed gearing, an engine connected to drive the gearing and having an intake manifold, a driven shaft, shiftable clutch means operable to connect or disconnect the shaft with the gearing, a brake operable to hold a portion of said gearing to condition the same for a driving speed, and control means for the brake comprising a pump driven from the engine, a second pump driven from the driving wheels, a conduit leading to the power means, connections from the pumps to the conduit, a valve in one of the connections, and means actuated by engine intake pressure for controlling the position of said valve to engage or release the brake means while the vehicle is standing still with the engine idling.

JESSE G. VINCENT.

REFERENCES CITED

The following references are of record in the file of this patent:

UNITED STATES PATENTS

| Number | Name | Date |
| --- | --- | --- |
| 1,843,194 | Banker | Feb. 2, 1932 |
| 1,938,914 | Kress | Dec. 12, 1933 |
| 2,094,449 | Forichon | Sept. 28, 1937 |
| 2,133,548 | Lassiter | Oct. 18, 1938 |
| 2,252,644 | Robin | Aug. 12, 1941 |
| 2,254,335 | Vincent | Sept. 2, 1941 |
| 2,319,388 | Cotterman | May 18, 1943 |
| 2,328,392 | Neracher | Aug. 31, 1943 |
| 2,332,593 | Nutt | Oct. 26, 1943 |
| 2,343,955 | Cotterman | Mar. 14, 1944 |
| 2,373,234 | Duffield | Apr. 10, 1945 |
| 2,374,303 | Osborne | Apr. 24, 1945 |

Certificate of Correction

Patent No. 2,568,135 September 18, 1951

JESSE G. VINCENT

It is hereby certified that error appears in the printed specification of the above numbered patent requiring correction as follows:

Column 3, line 21, for "tde" read *the*; column 4, line 57, for "coupling" read *clutch*; line 58, for "clutch" read *coupling*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*